United States Patent
Seo et al.

(10) Patent No.: US 8,208,545 B2
(45) Date of Patent: Jun. 26, 2012

(54) METHOD AND APPARATUS FOR VIDEO CODING ON PIXEL-WISE PREDICTION

(75) Inventors: Jeong-Il Seo, Daejeon (KR); Se-Yoon Jeong, Daejeon (KR); Kyu-Heon Kim, Daejeon (KR); Kyeong-Ok Kang, Daejeon (KR); Jin-Woo Hong, Daejeon (KR); Dong-Gyu Sim, Seoul (KR); Yung-Lyul Lee, Seoul (KR); Seoung-Jun Oh, Seongnam (KR); Chang-Beom Ahn, Seoul (KR); Jung-Hak Nam, Seoul (KR)

(73) Assignees: Electronics and Telecommunications Research Institute, Daejeon (KR); Kwangwoon University Research Institute for Industry Cooperation, Seoul (KR)

( * ) Notice: Subject to any disclaimer, the term of this patent is extended or adjusted under 35 U.S.C. 154(b) by 770 days.

(21) Appl. No.: 12/302,550

(22) PCT Filed: Dec. 27, 2006

(86) PCT No.: PCT/KR2006/005783
§ 371 (c)(1),
(2), (4) Date: Feb. 24, 2009

(87) PCT Pub. No.: WO2007/139266
PCT Pub. Date: Dec. 6, 2007

(65) Prior Publication Data
US 2009/0161759 A1      Jun. 25, 2009

(30) Foreign Application Priority Data

Jun. 1, 2006 (KR) .................. 10-2006-0049270

(51) Int. Cl.
*H04N 11/04* (2006.01)
*H04N 11/02* (2006.01)
(52) U.S. Cl. .............................. 375/240.12; 375/240.24
(58) Field of Classification Search ........................ None
See application file for complete search history.

(56) References Cited

U.S. PATENT DOCUMENTS 5,376,968 A    12/1994    Wu et al.
(Continued)

FOREIGN PATENT DOCUMENTS

EP            0 531 041 A1    3/1993
(Continued)

OTHER PUBLICATIONS

International Search Report-mailed Apr. 6, 2007; PCT/KR2006/005783.

*Primary Examiner* — Clemence Han
(74) *Attorney, Agent, or Firm* — Ladas & Parry LLP

(57) ABSTRACT

A pixel-based video encoding apparatus includes a block prediction unit, a residual image generation unit, a pixel prediction unit, and an entropy-coding unit. The block prediction unit performs temporal or spatial prediction between a reference image and a current image in order to generate a prediction block corresponding to a current block to be encoded. The residual image generation unit generates a residual image block composed of a residual signal corresponding to a difference between pixels of the prediction block and pixels of the current block. The pixel prediction unit determines whether to apply differential pulse coded modulation to each of pixels of the residual image block based on a rate distortion optimization value. The entropy-coding unit performs entropy-coding on the residual image block.

42 Claims, 13 Drawing Sheets

U.S. PATENT DOCUMENTS

| | | |
|---|---|---|
| 6,519,284 B1 | 2/2003 | Pesquet-Popescu et al. |
| 7,706,443 B2 * | 4/2010 | Chandramouly et al. ............... 375/240.12 |
| 7,751,476 B2 * | 7/2010 | Tanizawa et al. ........ 375/240.03 |
| 2005/0135484 A1 * | 6/2005 | Lee et al. ................. 375/240.16 |
| 2005/0157784 A1 * | 7/2005 | Tanizawa et al. ........ 375/240.03 |
| 2006/0008003 A1 * | 1/2006 | Ji et al. .................... 375/240.11 |
| 2006/0008038 A1 * | 1/2006 | Song et al. ..................... 375/350 |
| 2006/0114993 A1 * | 6/2006 | Xiong et al. ............. 375/240.11 |
| 2007/0121728 A1 * | 5/2007 | Wang et al. .............. 375/240.18 |

FOREIGN PATENT DOCUMENTS

| | | |
|---|---|---|
| JP | 05-063988 A | 3/1993 |
| KR | 100166722 B1 | 9/1998 |

* cited by examiner

FIG. 10

|  | News (QCIF) | Carphone (QCIF) | Foreman (QCIF) | Stephen (QCIF) | football (QCIF) |
|---|---|---|---|---|---|
| ENTIRE FRAME | 100 (30 Hz) | 100 (30 Hz) | 100 (30 Hz) | 100 (30 Hz) | 100 (30 Hz) |
| CONDITIONS : Only Intra Coding, Lossless Coding ||||||

FIG. 11

| Image | IM98 Bits/Frame | Proposed Bits/Frame | XDPCM method select(%) | Bits reduction(%) |
|---|---|---|---|---|
| Foreman | 187633.9 | 163659.4 | 75.75 | 12.8 |
| Carphone | 158658.9 | 131982.0 | 85.65 | 16.8 |
| News | 185725.3 | 145960.1 | 93.54 | 21.4 |
| Stephen | 287518.7 | 244025.4 | 98.73 | 15.1 |
| football | 219623.0 | 172433.1 | 99.94 | 21.5 |

METHOD AND APPARATUS FOR VIDEO CODING ON PIXEL-WISE PREDICTION

TECHNICAL FIELD

The present invention generally relates to video data coding, and more particularly, to an apparatus and method to improve compression performance using pixel-based prediction instead of block-based prediction in a lossless compression environment.

BACKGROUND ART

Recently, the demand for lossless compression coding for medical imaging or contents copyright application is increasing. To meet this demand, H.264/AVC (Advanced Video Coding) FRExt supports a new lossless compression method.

H.264/AVC, which is one of today's most widely used video compression standards, has been developed by the Joint Video Team (JVT) made up from experts of the ITU-T VCEG (Video Coding Experts Group) and the ISO/IEC MPEG (Moving Picture Experts Group).

DETAILED DESCRIPTION OF THE INVENTION

Technical Problem

H.264/AVC employs the intra-block coding that predicts a current block using previously coded neighbor blocks in a current frame and inter-block coding that predicts the current block using previously coded neighbor frames.

Those two schemes transform residual signals that are obtained from spatial prediction or motion estimation for blocks of various sizes. Then, the transform coefficients are coded. Since those block-based encoding methods have been developed on the assumption of lossy compression, they cannot exhibit ideal performance in lossless compression.

Moreover, data loss occurs after block-based transformation coding and quantization in lossy compression. During decoding, the data loss makes it impossible to accurately recognize a prediction value that has been used in encoding. Furthermore, an inaccurate prediction value may continuously propagate to subsequent decoded blocks.

Technical Solution

The present invention provides an apparatus and method to improve compression performance by removing spatial redundancy using pixel-based prediction, e.g., Difference Pulse Code Modulation (DPCM), instead of block-based prediction.

The present invention also provides a method to improve a data compression rate by adding a pixel-based prediction mode, e.g., a DPCM mode, into intraprediction when a prediction mode of a certain block is selected as intraprediction.

To decode an encoded image, previous pixel values are required for reconstruction of the current block. In lossy compression, a reconstructed previous pixel value is not exactly the same as a pixel of the original image, resulting in a different image than the original image encoded by an encoder. Therefore, it is suggested in the present invention to use DPCM for lossless compression.

The attached drawings for illustrating embodiments of the present invention are referred to in order to gain a sufficient understanding of the present invention, the merits thereof, and the objectives accomplished by the implementation of the present invention. While the present invention is particularly shown and described with reference to embodiments thereof, it will be understood by those of ordinary skill in the art that various changes in form and details may be made therein without departing from the spirit and scope of the invention as defined by the appended claims.

Advantageous Effects

The present invention can improve the compression rate of coding by largely reducing the bit rate of a residual image resulting from intraprediction or motion estimation during encoding for transmission or storage of an image. In the present invention, coding efficiency is improved by about 12-25% when compared to the case using conventional lossless compression of H.264/AVC FRExt.

Since DPCM used in the present invention processes an image pixel-by-pixel, the present invention is highly effective, especially in video compression using lossless compression.

Furthermore, the present invention can maximize compression efficiency by selectively using conventional prediction of H.264/AVC and DPCM pixel-based prediction according to a rate-distortion optimization (RDO) value.

BEST MODE

According to an aspect of the present invention, there is provided a pixel-based video encoding apparatus including a block prediction unit, a residual image generation unit, a pixel prediction unit, and an entropy-coding unit. The block prediction unit performs temporal or spatial prediction between a reference image and a current image in order to generate a prediction block corresponding to a current block to be encoded. The residual image generation unit generates a residual image block composed of a residual signal corresponding to a difference between pixels of the prediction block and pixels of the current block. The pixel prediction unit determines whether to apply differential pulse coded modulation (DPCM) to each of pixels of the residual image block based on a rate distortion optimization (RDO) value. RDO is conducted by computing the rate-distortion costs for the cases that DPCM is applied to each of the pixels of the residual image block or not. The entropy-coding unit performs entropy-coding on the residual image block.

According to another aspect of the present invention, there is provided a pixel-based video decoding apparatus including a reception unit, a pixel reconstruction unit, and a motion compensation unit. The reception unit receives a bitstream enclosing coefficients that result from entropy-decoding of a residual image block that selectively undergoes differential pulse coded modulation (DPCM) based on rate-distortion optimization (RDO) values and a mode flag indicating whether DPCM has been applied to the residual image block or not. The pixel reconstruction unit selectively performs inverse differential pulse coded modulation (IDPCM) on the coefficients based on the mode flag in order to reconstruct the residual image block. The motion compensation unit performs motion compensation based on the residual image block to which IDPCM is selectively applied.

According to another aspect of the present invention, there is provided a pixel-based video codec including a residual image generation unit, a pixel prediction unit, a pixel reconstruction unit, and a motion compensation unit. The residual image generation unit generates a prediction block corresponding to a current block to be encoded with a reference image or already decoded neighboring blocks and generates a residual image block composed of a residual signal corresponding to a difference between pixels of the prediction block and pixels of the current block. The pixel prediction unit determines whether to apply differential pulse coded modulation (DPCM) to each of pixels of the residual image block based on a rate distortion optimization (RDO) value calculated for the case where DPCM is applied to each of the pixels of the residual image block and a RDO value calculated for the case where DPCM is not applied to each of the pixels of the residual image block. The pixel reconstruction unit selectively performs inverse differential pulse coded modulation (IDPCM) on a bitstream generated by entropy-coding the residual image block in order to reconstruct the residual image block. The motion compensation unit performs motion compensation based on the residual image block to which IDPCM is selectively applied.

According to another aspect of the present invention, there is provided a pixel-based video codec including a block identification unit and a prediction mode determination unit. The block identification unit identifies the encoding mode of a current block of an input video frame and whether the current block is an intra-mode block or an inter-mode block. The prediction mode determination unit determines a prediction mode for the current block based on a rate distortion optimization (RDO) value calculated for the case where DPCM is applied to the current block and a RDO value calculated for the case where DPCM is not applied to the current block if the current block is an intra-mode block.

According to another aspect of the present invention, there is provided a pixel-based video encoding method. The pixel-based video encoding method includes performing temporal or spatial prediction with a reference image and already coded neighboring blocks in order to generate a prediction block corresponding to a current block to be encoded, generating a residual image block composed of a residual signal corresponding to a difference between pixels of the prediction block and pixels of the current block, performing pixel prediction by determining whether to apply differential pulse coded modulation (DPCM) to each of pixels of the residual image block based on a rate distortion optimization (RDO) value calculated for the case where DPCM is applied to each of the pixels of the residual image block and a RDO value calculated for the case where DPCM is not applied to each of the pixels of the residual image block, and performing entropy-coding on the residual image block.

According to another aspect of the present invention, there is provided a pixel-based video decoding method. The pixel-based video decoding method includes receiving a bitstream including coefficients that result from entropy-coding of a residual image block that selectively undergoes differential pulse coded modulation (DPCM) based on rate-distortion optimization (RDO) values and a mode flag indicating whether DPCM has been applied to the residual image block or not. Then, pixel reconstruction is achieved by selectively performing inverse differential pulse coded modulation (IDPCM) on the coefficients based on the mode flag in order to reconstruct the residual image block, and performing motion compensation based on the residual image block to which IDPCM is selectively applied.

According to another aspect of the present invention, there is provided a pixel-based video encoding method. The pixel-based encoding method includes generating a prediction block that corresponds to a current block to be encoded with a reference frame or already coded neighboring blocks. Then, a residual image block is degenerated, that is composed of a residual signal corresponding to a difference between pixels of the prediction block and pixels of the current block, performing pixel prediction by determining whether to apply differential pulse coded modulation (DPCM) to each of pixels of the residual image block based on a rate distortion optimization (RDO) value calculated for the case where DPCM is applied to each of the pixels of the residual image block and a RDO value calculated for the case where DPCM is not applied to each of the pixels of the residual image block, performing pixel reconstruction by selectively performing inverse differential pulse coded modulation (IDPCM) on a bitstream generated by entropy-coding the residual image in order to reconstruct the residual image block, and performing motion compensation based on the residual image block to which IDPCM is selectively applied.

According to another aspect of the present invention, there is provided a pixel-based video encoding method. The pixel-based video encoding method includes identifying the encoding mode of a current block of an input video frame, i.e., determining whether the current block is an intra-mode block or an inter-mode block and determining a prediction mode for the current block based on a rate distortion optimization (RDO) value calculated for the case where DPCM is applied to the current block and a RDO value calculated for the case where DPCM is not applied to the current block if the current block is the intra-mode block.

DESCRIPTION OF THE DRAWINGS

FIG. 10 illustrates experimental conditions using a lossless video encoding apparatus according to the present invention; and FIG. 11 is a view for comparing the number of bits per frame in intracoding of H.264 and the number of bits per frame in Difference Pulse Code Modulation (DPCM) of the present invention under the experimental conditions illustrated in FIG. 10.

MODE OF THE INVENTION

Figure 1A:
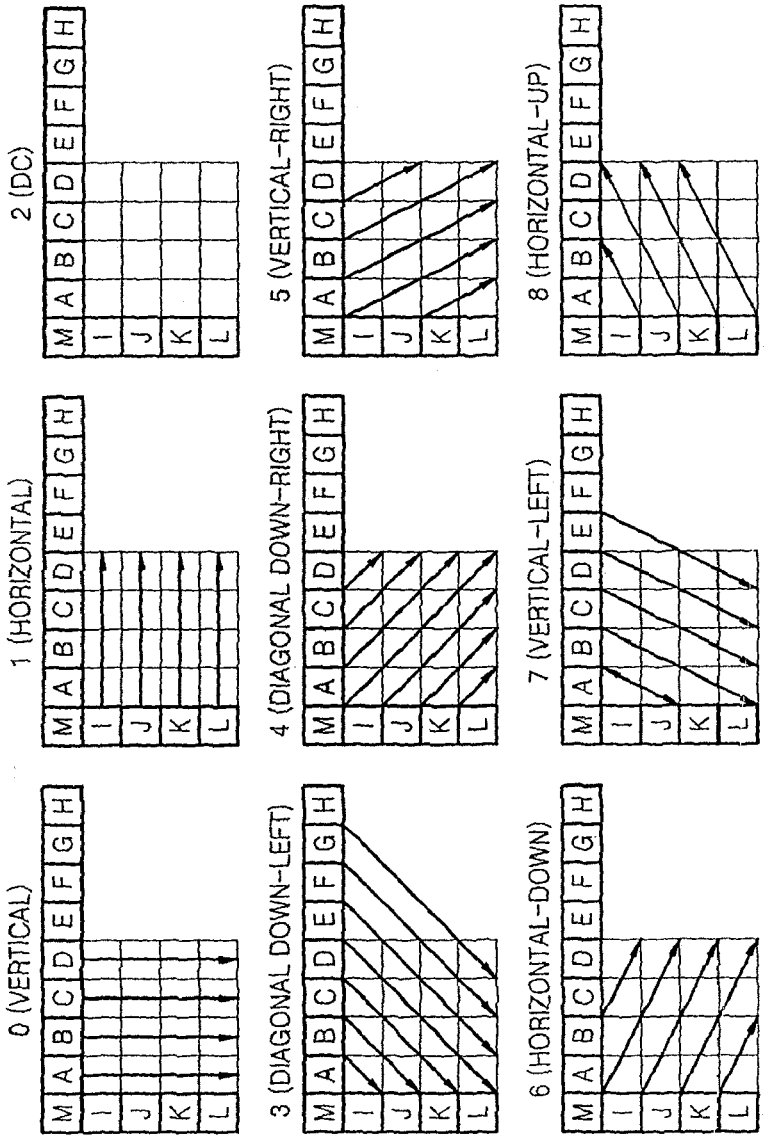
FIGS. 1A through 1C illustrate 9 intra-prediction modes according to H.264/AVC.

Hereinafter, exemplary embodiments of the present invention will be described in detail with reference to the attached drawings. It should be noted that like reference numerals refer to like elements throughout the specification. In the following description, detailed descriptions of known functions and configurations incorporated herein have been omitted for reasons of conciseness.

Figure 1B:
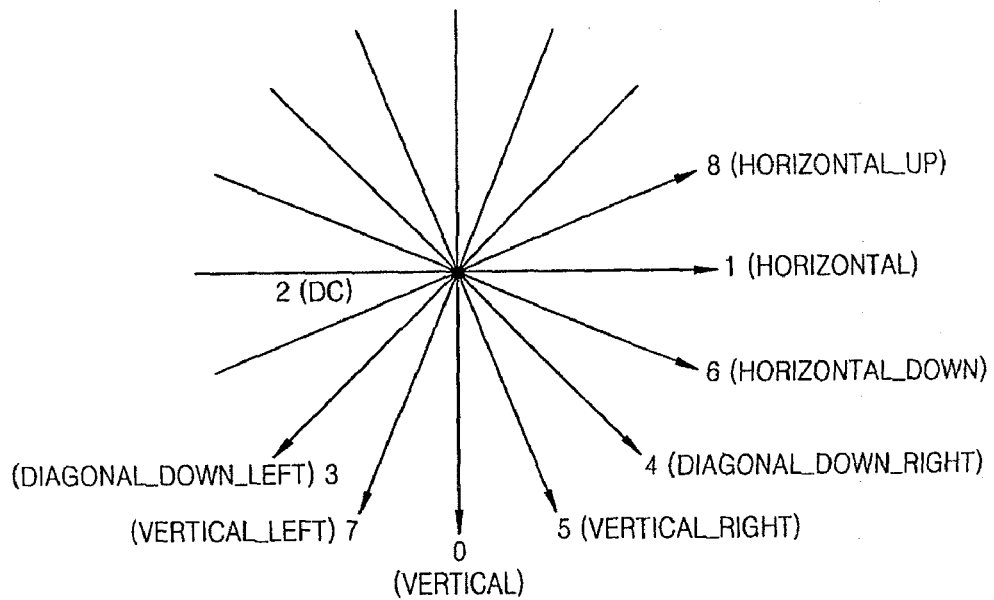
Figure 1C:
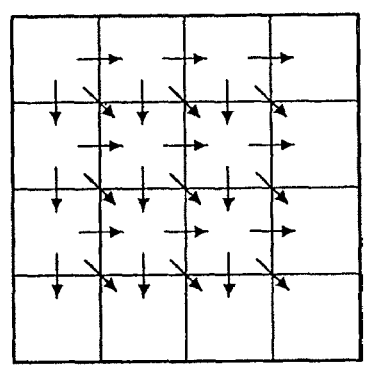

FIGS. 1A through 1C illustrate nine intra-prediction modes according to H.264/AVC.

Video encoding like the H.264/AVC employs two-fold prediction approaches. One is the intra-prediction coding that predicts the current block in the current frame using previously encoded neighbor blocks. The other is inter-prediction coding that predicts the current block in the current frame using a previously encoded neighbor frame.

Those two schemes encode coefficients that have undergone transformation coding after performing spatial prediction or motion estimation using blocks of various sizes. Intra-prediction of the H.264/AVC predicts the current pixel with an assumption that neighbor pixels adjacent to the current pixel may have similar values to the current pixel.

For 4×4 or 8×8 blocks of the H.264/AVC, pixels of the current block are predicted using several prediction modes considering 9 directivities as illustrated in FIGS. 1A through 1C. For example, when mode 0 (Vertical) is selected, pixels included in the same column are predicted to be one of pixels A, B, C, and D included in a block located above the current block.

As a result, a residual image resulting from intra-prediction according to H.264/AVC may have redundancy between pixels included in the same block. Encoding that removes spatial redundancy by applying pixel-based prediction, i.e., Difference Pulse Code Modulation (DPCM), to a residual image block will be described in more detail.

Figure 2A:
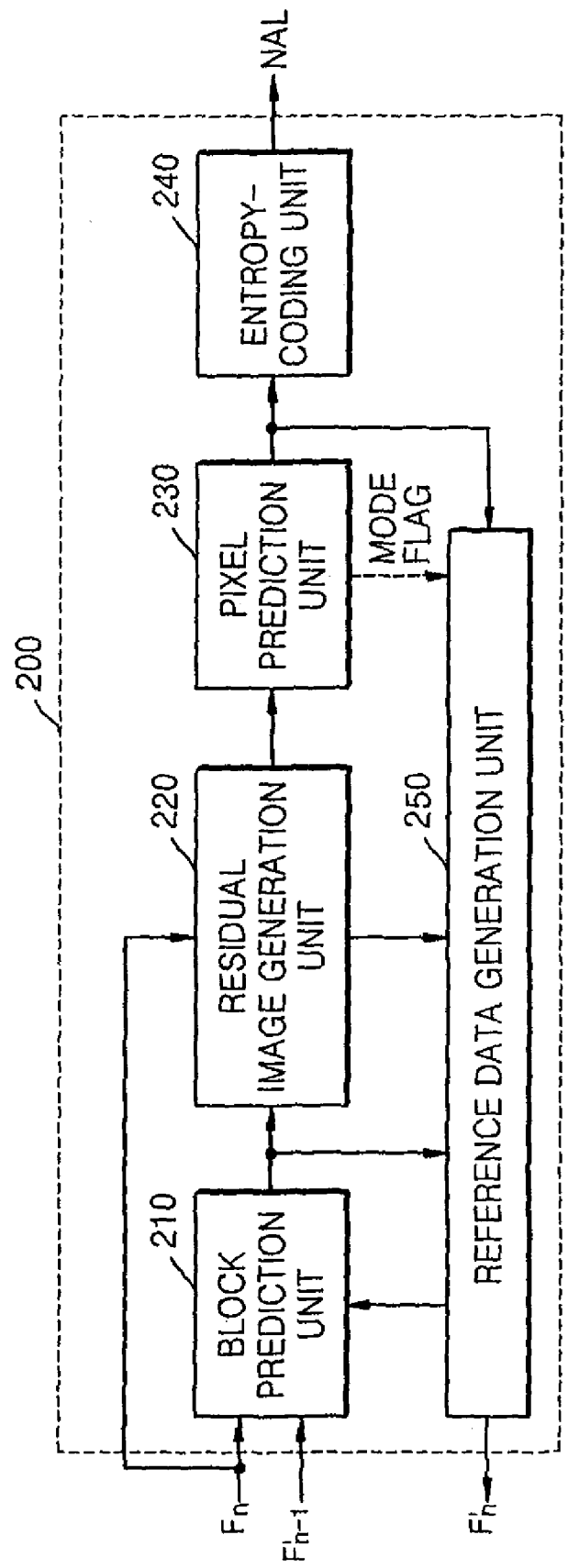
FIG. 2A is a block diagram of a lossless video encoding apparatus according to a first exemplary embodiment of the present invention.
Figure 2B:
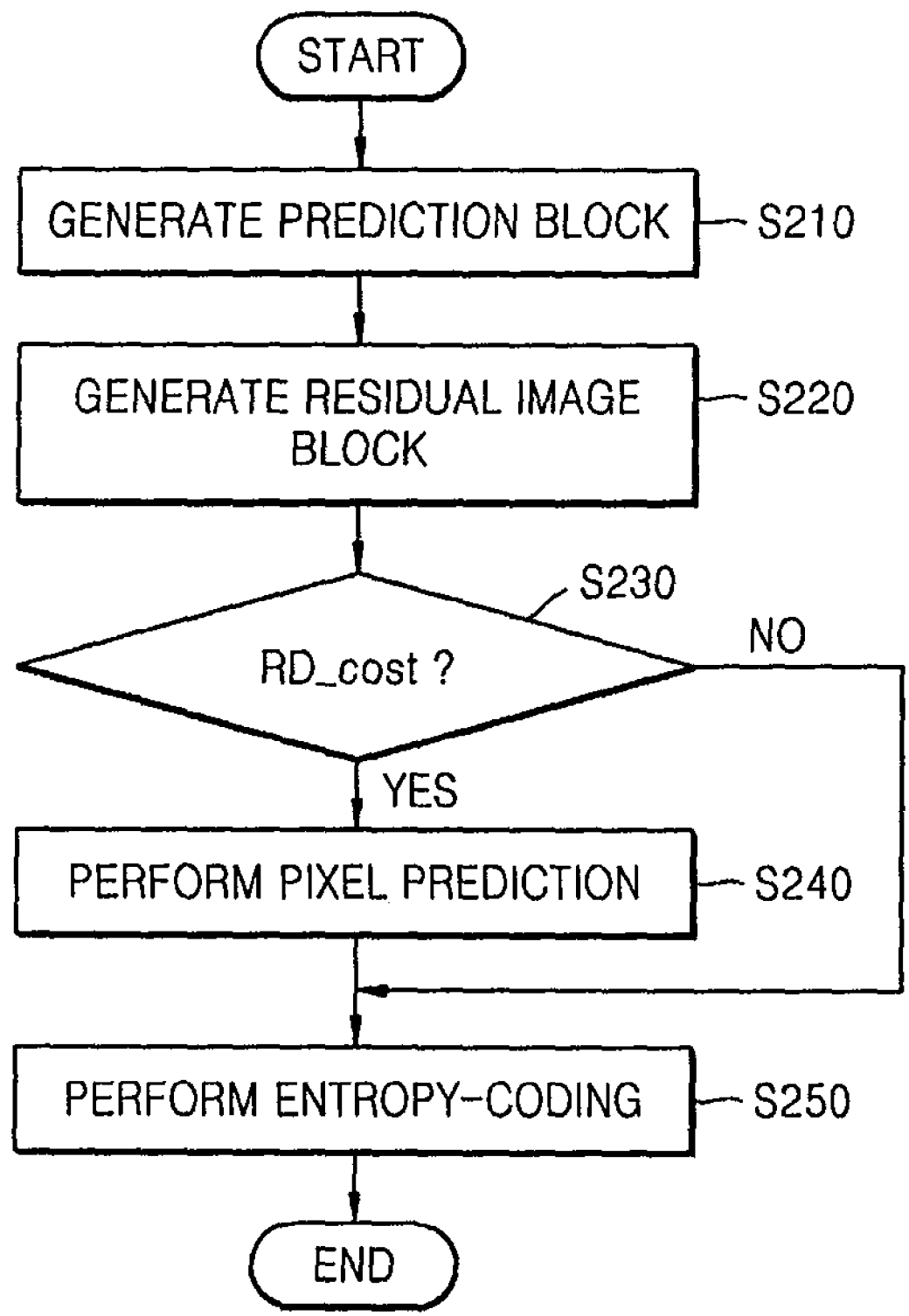
FIG. 2B is a flowchart of a lossless video encoding method according to the first exemplary embodiment of the present invention.

FIG. 2A is a block diagram of a lossless video encoding apparatus 200 according to an exemplary embodiment of the present invention, and FIG. 2B is a flowchart of a lossless video encoding method according to an exemplary embodiment of the present invention.

Referring to FIG. 2A, the lossless video encoding apparatus 200 includes a block prediction unit 210, a residual image generation unit 220, a pixel prediction unit 230, an entropy-coding unit 240, and a reference data generation unit 250.

In operation S210, the block prediction unit 210 generates a prediction block corresponding to the current block that is subject to encoding by performing intra-prediction for removing spatial redundancy between a current block and its already coded neighboring blocks or interprediction for removing temporal redundancy of the current block using already coded reference frames.

In operation S220, the residual image generation unit 220 generates a residual image only including a residual signal corresponding to a difference between pixels of the prediction block and pixels of the current block.

In operation S230, the pixel prediction unit 230 determines whether to apply DPCM for each pixel of a residual image block based on a rate-distortion optimization (RDO). The RDO is performed by computing rate-distortion cost for two cases. One is the case that DPCM is applied to each pixel of the residual image block and the other is the case that DPCM is not applied to the residual signals.

In operation S240, the pixel prediction unit 230 improves the compression efficiency of encoding by reducing spatial redundancy that may be generated in a residual image even when intra-prediction or inter-prediction is selected optimally for an image having much motion. The coefficients generated by the pixel prediction unit 230 are coded with an entropy coder like context adaptive arithmetic or other entropy coders.

However, the removal of redundancy by applying DPCM to each pixel of the residual image block may not be optimal for all blocks. Since some blocks may have fewer errors than in the case where DPCM is not applied, encoding may be performed without using DPCM according to an RDO value of Equation 1 which affects the result of operation S230.

In other words, the pixel prediction unit 230 selectively performs DPCM according to an RDO value suggested in H.264 like in Equation 1, thereby removing redundancy between pixels in the residual image block. Therefore, the pixel prediction unit 230 has to inform the reference data generation unit 250 of whether to apply DPCM to the current block.

$$J = \text{Distortion} + \lambda_{MODE} * \text{Rate}$$

$$\text{MODE} H[\text{INTRA}4*4, \text{INTRA}16*16] \qquad (1),$$

where Distortion indicates a difference between the original image and a reconstructed image, Rate indicates the number of bits generated by entropy-coding, and $\lambda_{MODE}$ indicates a Lagrangian constant. A mode that minimizes J of Equation 1 is determined as an optimal mode.

In operation S250, the entropy-coding unit 240 performs entropy-coding on the residual image block. Entropy-coded coefficients form a bitstream, together with necessary information required for decoding of blocks in a macroblock, such as prediction modes and motion vector information, and thus are transmitted through a network abstraction layer (NAL) or are stored.

The reference data generation unit 250 decodes the residual image block in order to generate reference data for subsequent predictions. The reference data generation unit 250 receives a signal indicating whether DPCM has been performed from the pixel prediction unit 230.

If the signal indicates that DPCM has been performed by the pixel prediction unit 230, the reference data generation unit 250 reconstructs the residual image block by performing inverse differential pulse code modulation (IDPCM). If the signal indicates that DPCM has not been performed, the reference data generation unit 250 does not perform IDPCM.

The lossless video encoding apparatus 200 has to inform a decoder of whether DPCM has been used for the current block. In this case, such informing may require further information in addition to a compressed bitstream, but an even greater bit gain can be obtained by using DPCM than in the case where DPCM is not used, as will be described with reference to FIGS. 6 and 7.

Figure 3A:
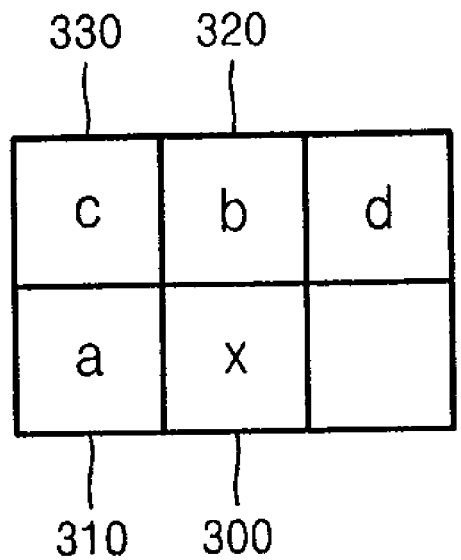
FIG. 3A illustrates neighbor pixels used in prediction of the current pixel using Difference Pulse Code Modulation (DPCM) according to an exemplary embodiment of the present invention.
Figure 3B:
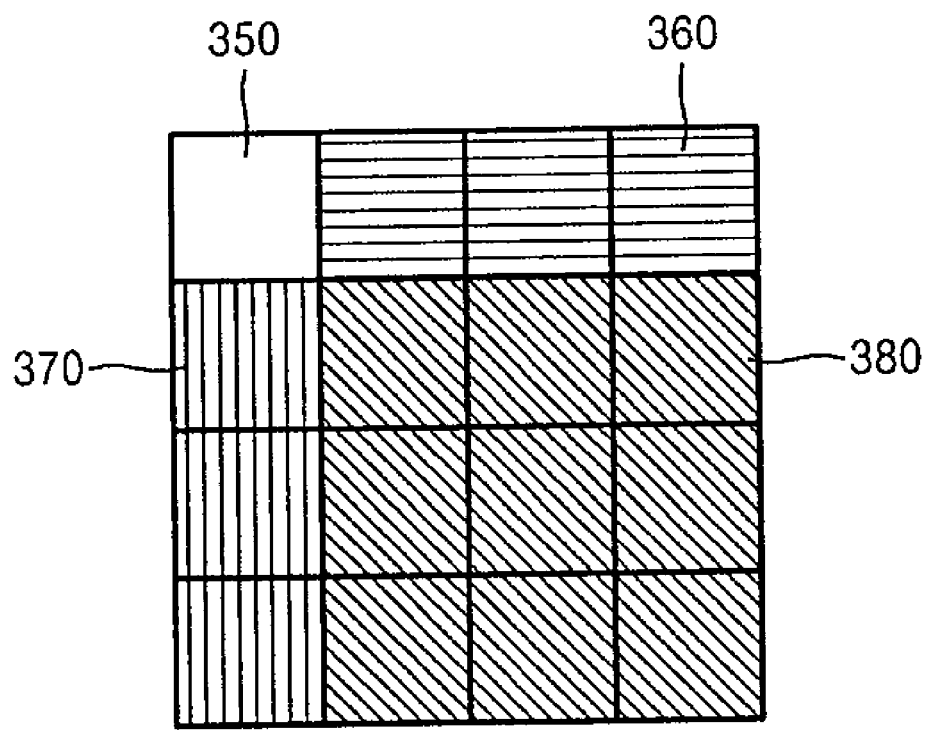
FIG. 3B illustrates prediction methods varying with pixel positions according to an exemplary embodiment of the present invention.

FIGS. 3A and 3B illustrate neighbor pixels used in the prediction of the current pixel using DPCM and different prediction methods with different pixel positions in order to remove redundancy between pixels in a residual image block, according to an exemplary embodiment of the present invention.

Prediction using DPCM according to the present invention involves predicting pixels of the current block using pixels of a neighbor block and pixels of the current block unlike conventional prediction, which uses only pixels of a neighbor block.

The current block may have a size of 4×4, 8×8, or N×M. FIG. 3A illustrates neighbor pixels used to predict the luminance value of a current pixel x 300 in a predetermined N×N block.

The luminance value of the current pixel x 300 is predicted using a pixel a 310 located to the left of the current pixel x 300, a pixel b 320 located above the current pixel x 300, and a pixel c 330 located to the upper left of the current pixel x 300.

FIG. 3B illustrates prediction methods varying with pixel positions in a 4×4 block according to an exemplary embodiment of the present invention.

In FIG. 3B, a first pixel 350 in the current block has no neighbor pixel and thus uses a pixel of a residual image generated after intra-prediction of H.264 without being predicted.

Each of pixels 360 in the top row, except for the first pixel 350, has a neighbor pixel located horizontally, i.e., located to the left of the current pixel 360 and thus is predicted using the pixel to the left. By using basic DPCM, a pixel located to the left of the current pixel is a prediction pixel for the current pixel and encoding is performed using a difference between the current pixel and the prediction pixel.

Each of pixels 370 in the left-most column, except for the first pixel 350, has a neighbor pixel located vertically, i.e., located above the current pixel 370 and thus is predicted using the pixel located above. Similarly to the above-described prediction, a pixel located above the current pixel is a prediction pixel for the current pixel and encoding is performed using a difference between the current pixel and the prediction pixel.

Each of the remaining pixels 380 has required neighbor pixels and thus is predicted using those neighbor pixels.

Pixel-based prediction used in the pixel prediction unit 230 may be performed using various equations. In the present invention, an edge detected prediction (EDP) algorithm will be used as an example. Therefore, it should be noted that the EDP algorithm does not limit pixel-based prediction.

The EDP algorithm is given by:

$$\hat{x}_{EDP} = \begin{cases} \min(a, b) & \text{if } c > \max(a, b) \\ \max(a, b) & \text{if } c < \min(a, b) \\ a + b - c & \text{otherwise} \end{cases} \quad (2)$$

In the present invention, the current pixel is predicted according to the EDP algorithm and its position as illustrated in FIG. 3B.

For example, if the pixel c 330 is the largest in luminance value among the neighbor pixels a 310, b 320, and c 330, the larger one between the pixels a 310 and b 320 is determined as an edge that is similar in value to the pixel c 330 and the smaller one is used as a prediction pixel for the current pixel x 300.

On the other hand, if the pixel c 330 is the smallest in luminance value, the larger one between the pixels a 310 and b 320 is used as a prediction pixel for the current pixel x 300. In other cases, it is determined that there is no edge and the current pixel x300 is predicted with a+b−c.

Figure 4:
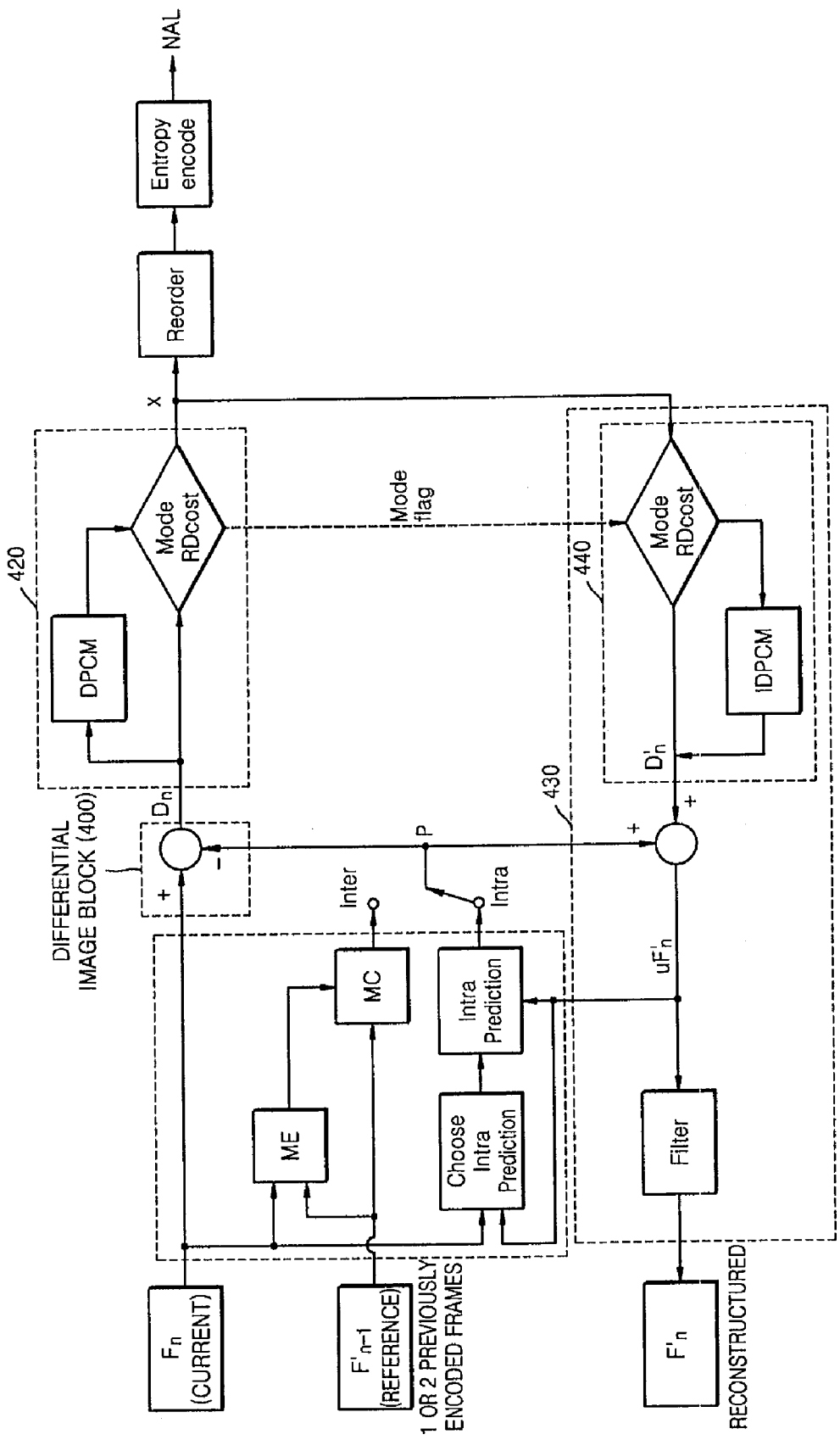
FIG. 4 is a block diagram of a first implementation of the lossless video encoding apparatus.

FIG. 4 is a block diagram of a first implementation of the lossless video encoding apparatus 200.

Referring to FIG. 4, for encoding with respect to a predetermined-size block, e.g., a 4×4 block, of an input current frame, a residual image block 400 is generated from the current frame through an intra-prediction unit or an inter-prediction unit.

It is determined whether to apply pixel-based prediction, i.e., DPCM, to the residual image block 400 by comparing an RD cost calculated for the case where DPCM is applied to the residual image block 400 with an RD cost calculated for the case where DPCM is not applied to the residual image block 400, in 420.

A mode flag indicating whether DPCM has been applied to the residual image block 400 is transmitted to a reconstruction path 430 of an encoder for the generation of a reference frame for a next frame. The reconstruction path 430 determines whether to perform IDPCM based on the mode flag in 440. The residual image block 400 to which DPCM is selectively applied is entropy-coded. Since this case corresponds to lossless encoding, transformation coding and quantization are skipped.

Figure 5:
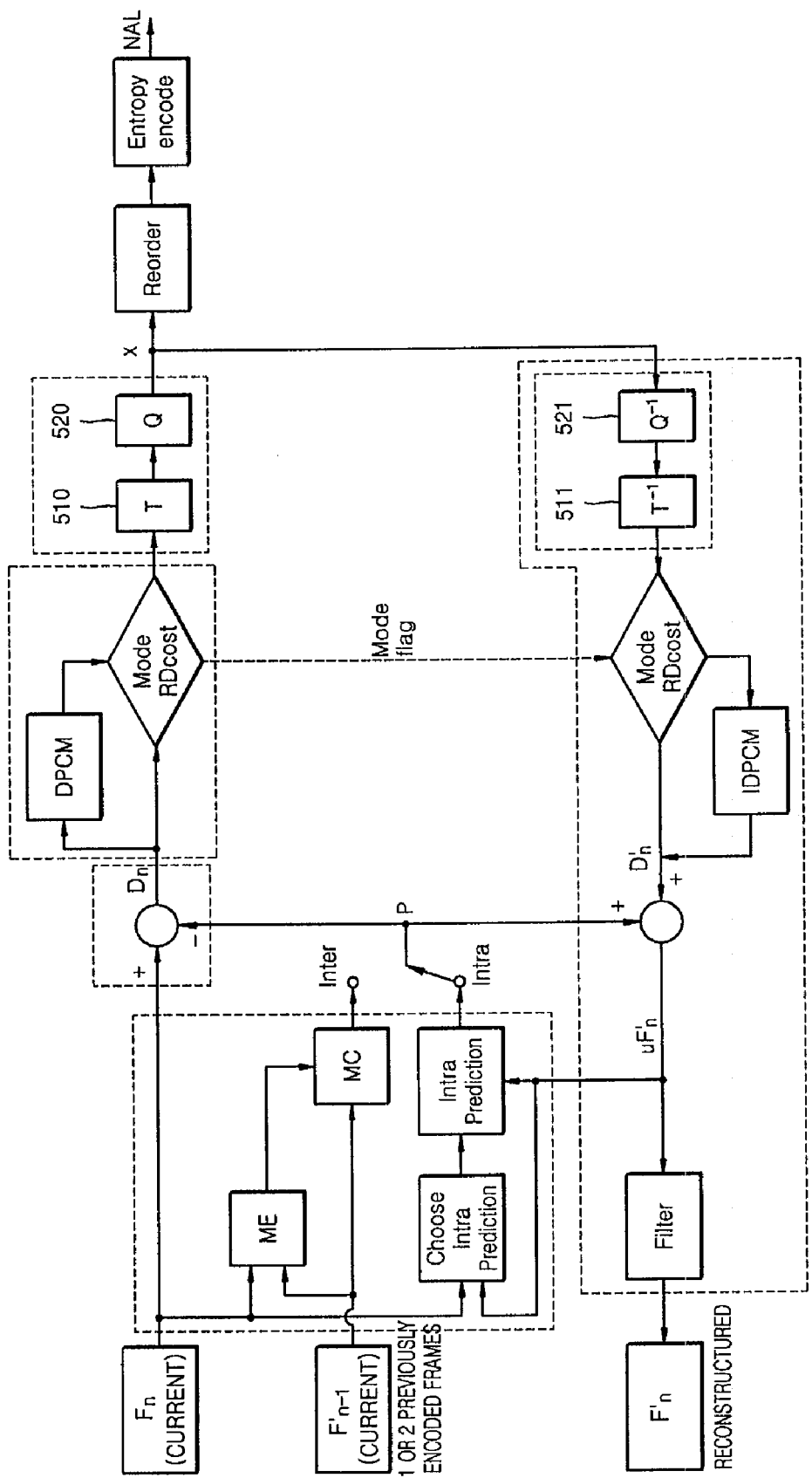
FIG. 5 is a block diagram of a second implementation of the lossless video encoding apparatus.

FIG. 5 is a block diagram of a second implementation of the lossless video encoding apparatus 200.

In FIG. 5, transformation encoding 510 and quantization 520 are added to the arrangement shown in FIG. 4.

In this case, a reconstruction path corresponding to the reference data generation unit 250 illustrated in FIG. 2 further includes an inverse quantization unit 521 and an inverse transformation unit 511.

Figure 6A:
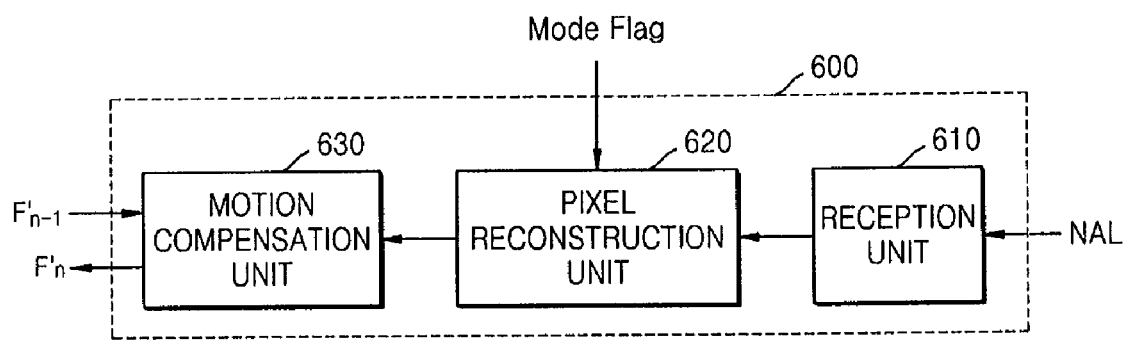
FIG. 6A is a block diagram of a lossless video decoding apparatus according to an exemplary embodiment of the present invention.
Figure 6B:
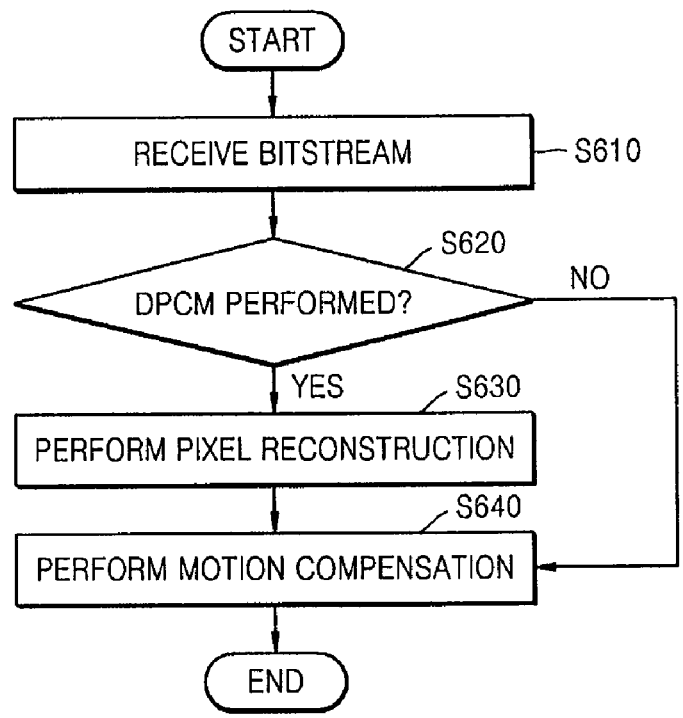
FIG. 6B is a flowchart of a lossless video decoding method according to an exemplary embodiment of the present invention.

FIG. 6A is a block diagram of a lossless video decoding apparatus 600 according to an exemplary embodiment of the present invention, and FIG. 6B is a flowchart of a lossless video decoding method according to an exemplary embodiment of the present invention. The lossless video decoding apparatus 600 decodes an image encoded by the implementations illustrated in FIGS. 2A, 2B, 4, and 5.

The lossless video decoding apparatus 600 includes a reception unit 610, a pixel reconstruction unit 620, and a motion compensation unit 630.

The reception unit 610 receives a bitstream including coefficients resulting from entropy-encoding for a residual image block that selectively undergoes DPCM based on the RD costs and a mode flag indicating whether DPCM has been applied to the residual image block in operation S610.

The pixel reconstruction unit 620 selectively performs IDPCM on the coefficients based on the mode flag, thereby reconstructing the residual image block in operations S620 and S630. IDPCM performed by the pixel reconstruction unit 620 is the same as that performed by the reference data generation unit 250 illustrated in FIG. 2.

For example, the lossless video encoding apparatus 200 may provide '1' as the mode flag to the lossless video decoding apparatus 600 if it uses pixel-based prediction DPCM for the current block and may provide '0' to the lossless video decoding apparatus 600 if it does not use pixel-based prediction DPCM.

If the lossless video encoding apparatus 200 does not use pixel-based prediction DPCM, i.e., the mode flag is '0', the apparatus 600 performs spatial prediction compensation based on pixels of a previously decoded neighbor block like in conventional intraprediction.

If the lossless video encoding apparatus 200 uses pixel-based prediction DPCM, i.e., the mode flag is '1', the lossless video decoding apparatus 600 decodes the current block using IDPCM corresponding to DPCM used in the lossless video encoding apparatus 200, thereby obtaining a reconstructed image. The mode flag is included in the bitstream output from the lossless video encoding apparatus 200 and is received by the reception unit 610 of the lossless video decoding apparatus 600.

The motion compensation unit 630 performs motion compensation corresponding to spatial-temporal prediction based on the residual image block to which IDPCM is selectively applied, thereby reconstructing the current block in operation S640.

Figure 7:
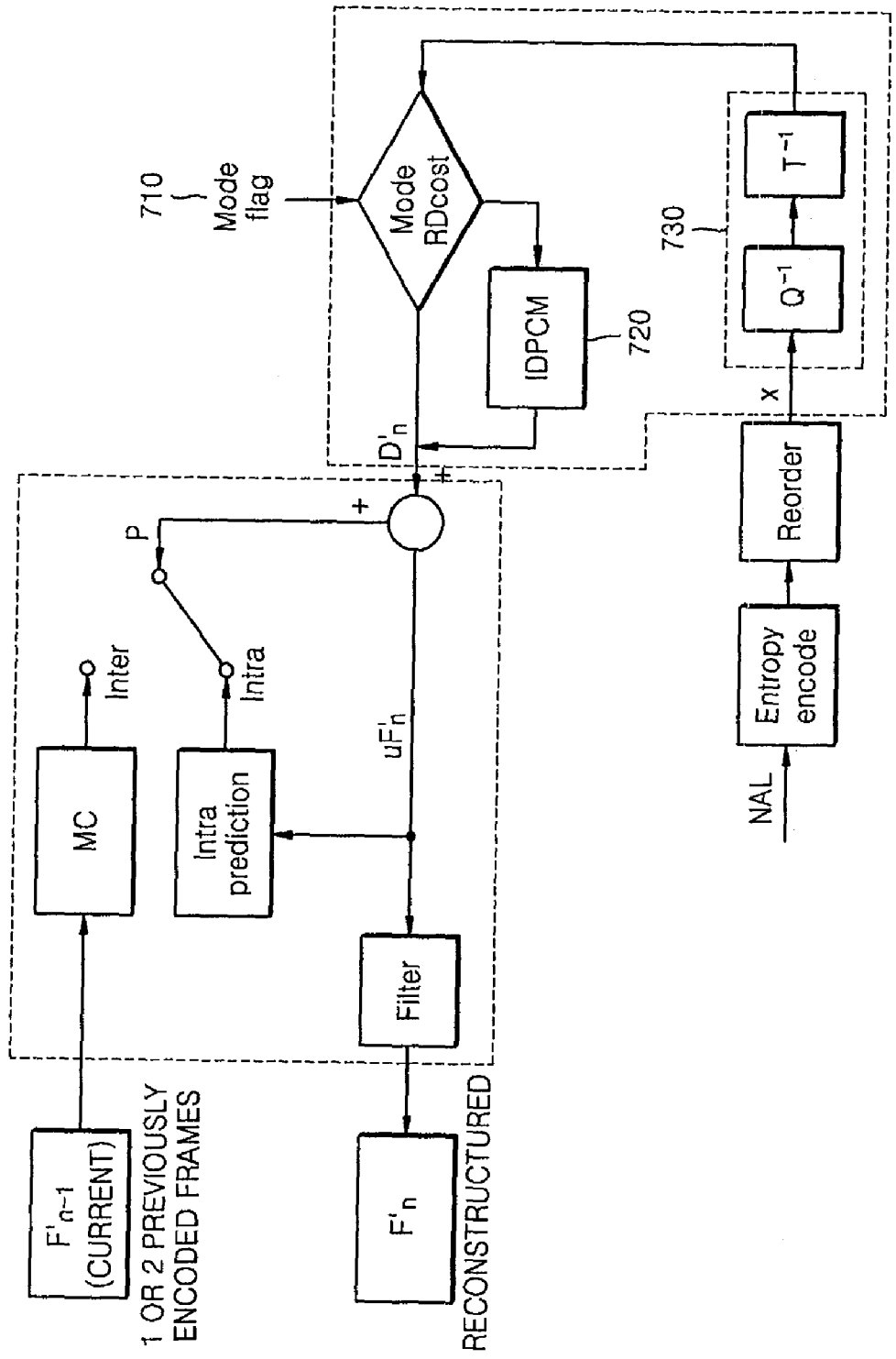
FIG. 7 is a block diagram of an implementation of the lossless video decoding apparatus.

FIG. 7 is a block diagram of an implementation of the lossless video decoding apparatus 600.

FIG. 7 shows a lossless video decoding apparatus for decoding an image encoded by the implementation illustrated in FIG. 5. Since a pixel-based computation result is encoded when DPCM suggested as pixel-based prediction in the present invention is used an IDCT (inverse DCT)/inverse quantization unit 730 may be omitted for the same reconstruction in a decoding stage as in an encoding stage. It is determined whether to apply IDPCM 720 based on a mode flag 710 determined during the decoding stage.

Figure 8A:
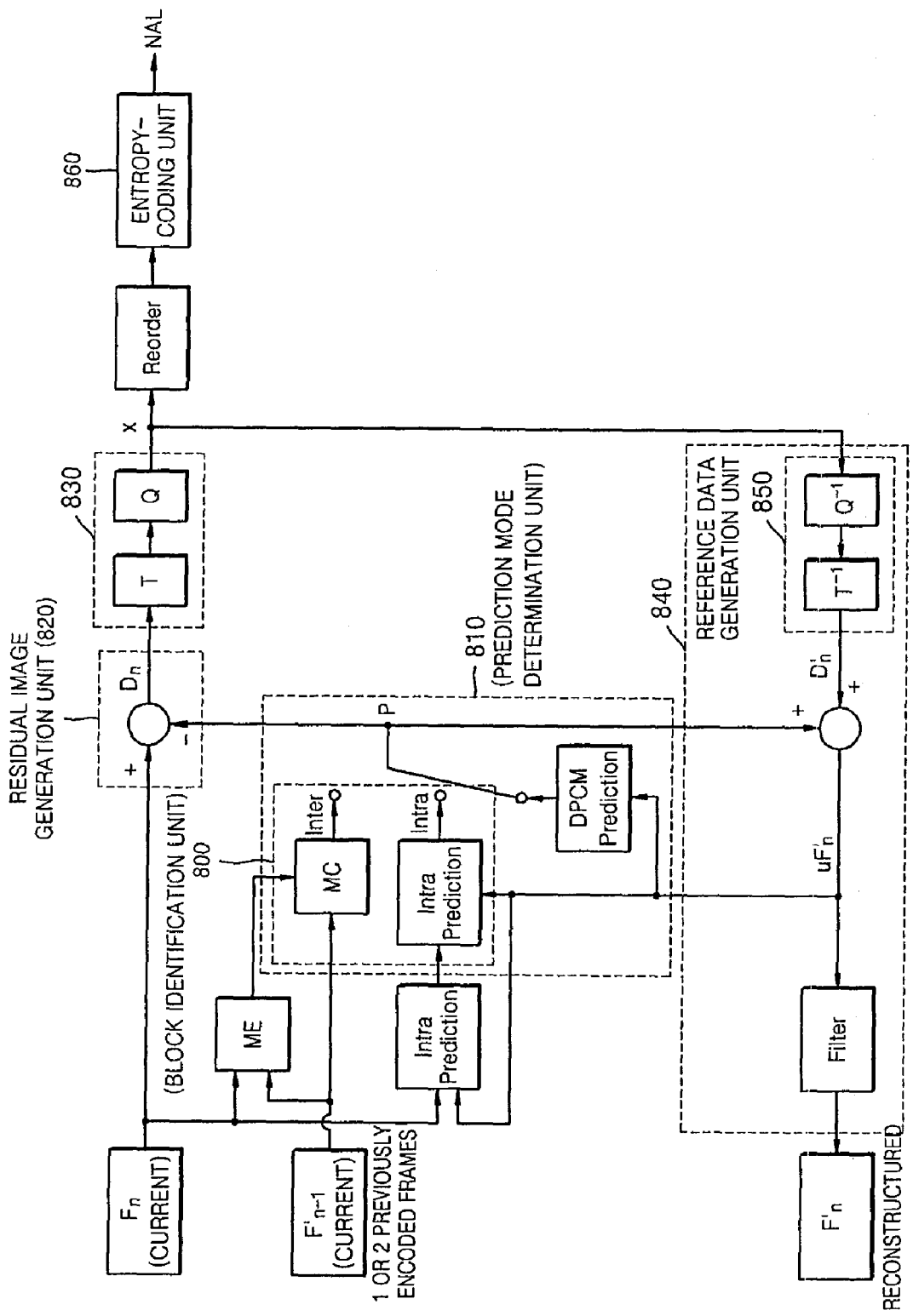
FIG. 8A is a block diagram of a video encoding apparatus using pixel-based prediction according to a second exemplary embodiment of the present invention.
Figure 8B:
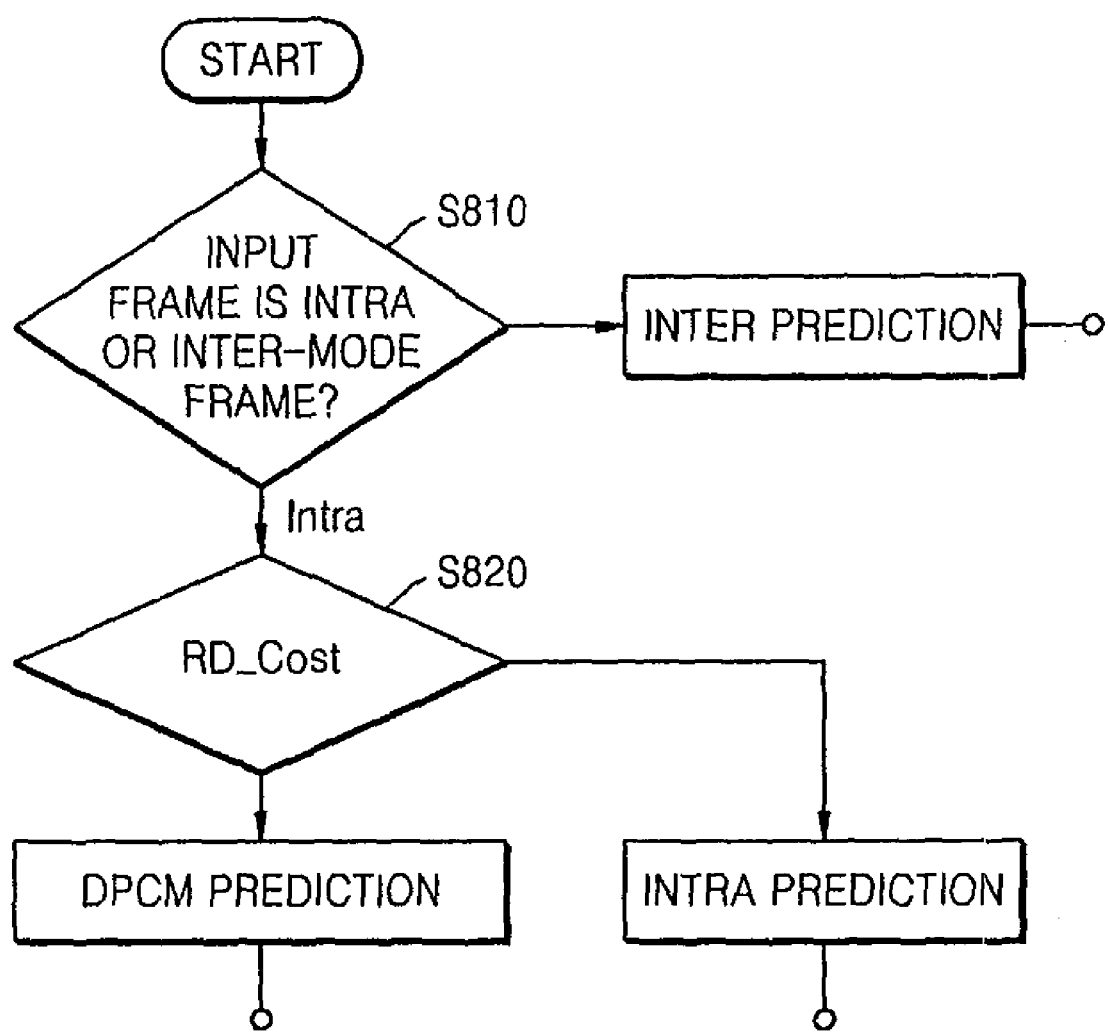
FIG. 8B is a flowchart of a video encoding method using pixel-based prediction according to the second exemplary embodiment of the present invention.

FIG. 8A is a block diagram of a video encoding apparatus using pixel-based prediction according to an exemplary embodiment of the present invention, and FIG. 8B is a flowchart of a video encoding method using pixel-based prediction according to the an exemplary embodiment of the present invention. In FIGS. 8A and 8B, a DPCM prediction mode is added to intra-prediction modes.

The video encoding apparatus includes a prediction mode determination unit 810, a residual image generation unit 820, a reference data generation unit 840, and an entropy-coding unit 860, and may further include a transformation/quantization unit 830.

If the video encoding apparatus further includes the transformation/quantization unit 830, the reference data generation unit 840 may further include an inverse transformation/inverse quantization unit 850 corresponding to the transformation/quantization unit 830.

The block identification unit 800 identifies the encoding mode of the current block of an input video frame, i.e., determines whether the current block is an intra-mode block or an inter-mode block in operation S810. If the current block is an intra-mode block, the prediction mode determination unit 810 obtains an RD cost for an intra-prediction result of the intra-mode block and an RDcost for a DPCM result of the intra-mode block using Equation 1 and determines whether to apply a DPCM prediction mode or an intra-prediction mode to the intra-mode block based on the RD costs in operation S820.

Pixel-based prediction is used for a residual image obtained after conventional spatial-temporal prediction of the H.264 in the embodiment of the present invention described with reference to FIGS. 2A, 2B, 4, and 5, but a DPCM prediction mode is used on the original image as a new prediction mode in addition to intra-prediction modes of H.264 in the current embodiment of the present invention described with reference to FIGS. 8A and 8B.

H.264/AVC may have different prediction modes for different block sizes. In the present invention, however, a DPCM prediction mode is used as a new prediction mode regardless of a block size. Unlike conventional prediction methods using only pixels of a neighbor block, prediction based on the DPCM uses pixels of neighbor blocks and pixels of the current block for prediction of the pixels of the current block.

The residual image generation unit 820 generates a prediction block corresponding to the current block in a prediction mode determined by the prediction mode determination unit 810 and generates a residual image block composed of a residual signal corresponding to a difference between pixels of the prediction block and pixels of the current block. The reference data generation unit 840 decodes the residual image block, thereby generating reference data for subsequent prediction.

The entropy-coding unit 860 performs entropy-coding on the residual image block generated by the residual image generation unit 820.

Figure 9:
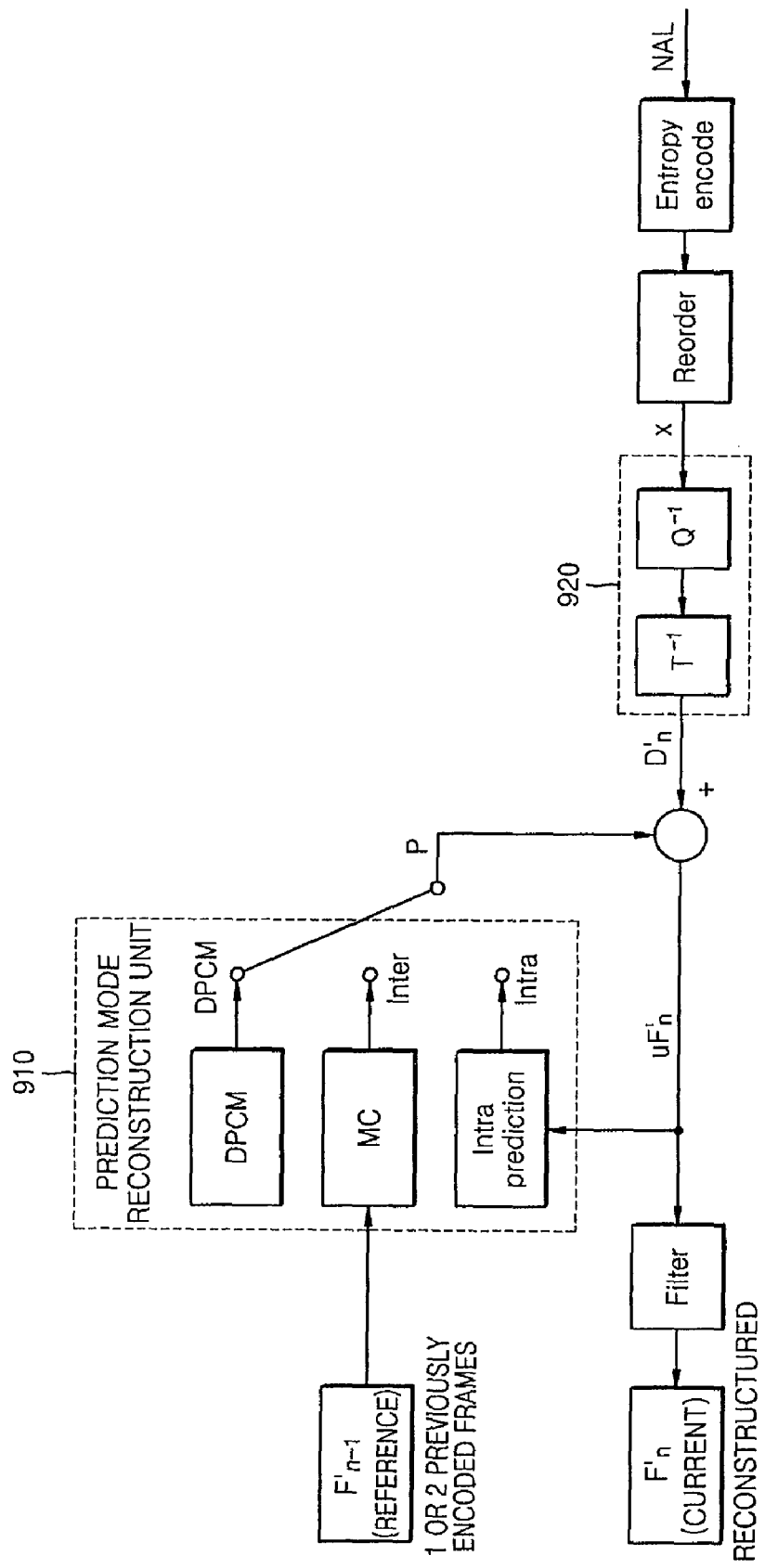
FIG. 9 is block diagram of a video decoding apparatus using pixel-based prediction according to a second exemplary embodiment of the present invention.

FIG. 9 is block diagram of a video decoding apparatus using pixel-based prediction according to an exemplary embodiment of the present invention.

The video decoding apparatus illustrated in FIG. 9 decodes a bitstream transmitted by the video encoding apparatus illustrated in FIG. 8A. In this case, the video decoding apparatus performs decoding according to whether the received bitstream is encoded using intra-coding, interceding, or DPCM coding. The video decoding apparatus can recognize the coding mode of the received bitstream based on mode information included in the bitstream during encoding.

If the video encoding apparatus uses DPCM, the prediction mode reconstruction unit 910 performs IDPCM on all the pixels included in the residual image block by obtaining a pixel that has been used for prediction of the current pixel among neighbor pixels around the current pixel and adding the obtained pixel to the current pixel to reconstruct a pixel of the original image.

If the transformation/quantization unit 830 is not included in the video encoding apparatus illustrated in FIG. 8A, the inverse transformation/inverse quantization unit 920 corresponding to the transformation/quantization unit 830 may be omitted in order for the same reconstruction to be performed in a decoding stage as in an encoding stage.

FIG. 10 illustrates experimental conditions using a lossless video encoding apparatus according to the present invention, in which the predetermined DPCM suggested in the present invention is applied to experimental images recommended by the H.264.

FIG. 11 shows the average number of bits per frame in intra-coding of H.264 and the average number of bits per frame in DPCM of the present invention under the experimental conditions illustrated in FIG. 10, in which the rate of blocks to which DPCM is applied in 100 frames of each of the experimental images and a compression efficiency improvement in each of the experimental images are shown. DPCM suggested in the present invention is selected for at least 90% blocks on the average. Moreover, according to the present invention, a compression rate improvement of about 17.5% can be obtained on the average.

The present invention can also be embodied as a computer-readable code on a computer-readable recording medium. The computer-readable recording medium is any data storage device that can store data which can be thereafter read by a computer system.

Examples of the computer-readable recording medium include read-only memory (ROM), random-access memory (RAM), CD-ROMs, magnetic tapes, floppy disks, optical data storage devices, and carrier waves (transmission over the Internet). The computer-readable recording medium can also be distributed over network coupled computer systems so that the computer-readable code is stored and executed in a distributed fashion.

The present invention has been particularly shown and described with reference to exemplary embodiments thereof. Terms used herein are only intended to describe the present invention and are not intended to limit the meaning or scope of the present invention as defined in the claims.

Therefore, it will be understood by those of ordinary skill in the art that various changes in form and details may be made therein without departing from the spirit and scope of the present invention as defined by the following claims. Accordingly, the disclosed embodiments should be considered in a descriptive sense only and not in a restrictive sense.

The scope of the present invention will be defined by the appended claims, and differences within the scope should be construed to be included in the present invention.

The invention claimed is:

1. A pixel-based video encoding apparatus comprising:
    a block prediction unit performing temporal or spatial prediction between a reference image and a current image in order to generate a prediction block corresponding to a current block to be encoded;
    a residual image generation unit generating a residual image block composed of a residual signal corresponding to a difference between pixels of the prediction block and pixels of the current block;
    a pixel prediction unit determining whether to apply differential pulse coded modulation (DPCM) to each of pixels of the residual image block based on a rate distortion optimization (RDO) value calculated for case where DPCM is applied to each of the pixels of the residual image block and a RDO value calculated for case where DPCM is not applied to each of the pixels of the residual image block; and
    an entropy-coding unit performing entropy-coding on the residual image block.

2. The pixel-based video encoding apparatus of claim 1, further comprising a reference data generation unit decoding the residual image block in order to generate reference data for prediction of a next block.

3. The pixel-based video encoding apparatus of claim 2, wherein the pixel prediction unit transmits a signal indicating whether DPCM has been applied to the reference data generation unit.

4. The pixel-based video encoding apparatus of claim 2, further comprising:
    a transformation unit transforming the residual image block obtained by the pixel prediction unit; and
    a quantization unit quantizing the transformed residual image block and transmitting the quantized residual image block to the entropy-coding unit.

5. The pixel-based video encoding apparatus of claim 4, wherein the reference data generation unit comprises:
    an inverse quantization unit corresponding to the quantization unit and inversely quantizing the quantized residual image block; and
    an inverse transformation unit corresponding to the transformation unit, inversely transforming the inversely quantized residual image block.

6. The pixel-based video encoding apparatus of claim 1, wherein the pixel prediction unit applies DPCM by predicting a luminance value of a current pixel from luminance values of neighbor pixels located around the current pixel in the residual image block.

7. The pixel-based video encoding apparatus of claim 6, wherein a luminance value $\hat{x}_{KDP}$ of the current pixel x is given by:

$$\hat{x}_{EDP} = \begin{cases} \min(a, b) & \text{if } c > \max(a, b) \\ \max(a, b) & \text{if } c < \min(a, b) \\ a + b - c & \text{otherwise} \end{cases}$$

where c indicates a luminance value of an edge pixel in the residual image block, and a and b indicate luminance values of neighbor pixels around the edge pixel with the luminance value of c, and
    the neighbor pixel with the smaller luminance value between a and b is used as a prediction pixel for the current pixel x if c is largest among a, b, and c, the neighbor pixel with the larger luminance value between a and b is used as the prediction pixel for the current pixel x if c is smallest, and it is determined that there is no edge and the luminance value of the current pixel x is predicted using a+b−c in other cases.

8. A pixel-based video decoding apparatus comprising:
    a reception unit receiving a bitstream including coefficients resulting from entropy-coding of a residual image block that selectively undergoes differential pulse coded modulation (DPCM) and a mode flag having information about whether DPCM has been applied to the residual image block;
    a pixel reconstruction unit selectively performing inverse differential pulse coded modulation (IDPCM) on the coefficients based on the mode flag in order to reconstruct the residual image block; and
    a motion compensation unit performing motion compensation based on the residual image block to which IDPCM is selectively applied.

9. The pixel-based video decoding apparatus of claim 8, further comprising:
    an inverse quantization unit inversely quantizing the received bitstream; and
    an inverse transformation unit inversely transforming the inversely quantized bitstream and transmitting the inversely quantized bitstream to the pixel reconstruction unit.

10. The pixel-based video decoding apparatus of claim 8, wherein the pixel reconstruction unit performs IDPCM by reconstructing a luminance value of a current pixel based on luminance values of neighbour pixels located around the current pixel in the residual image block.

11. A pixel-based video codec stored in a non-transitory media which includes a computer-readable media as well as a machine/computer comprising:
    a residual image generation unit generating a prediction block corresponding to a current block to be encoded between a reference image and a current image and generating a residual image block composed of a residual signal corresponding to a difference between pixels of the prediction block and pixels of the current block;
    a pixel prediction unit determining whether to apply differential pulse coded modulation (DPCM) to each of pixels of the residual image block based on a rate distortion optimization (RDO) value calculated for the case where DPCM is applied to each of the pixels of the residual image block and a RDO value calculated for the case where DPCM is not applied to each of the pixels of the residual image block;
    a pixel reconstruction unit selectively performing inverse differential pulse coded modulation (IDPCM) on a bitstream generated by entropy-coding the residual image block in order to reconstruct the residual image block; and
    a motion compensation unit performing motion compensation based on the residual image block to which IDPCM is selectively applied.

12. The pixel-based video codec of claim 11, wherein the pixel prediction unit transmits information about whether DPCM has been applied to the pixel reconstruction unit through the bitstream.

13. The pixel-based video codec of claim 11, further comprising a reference data generation unit decoding the residual image block to which DPCM has been selectively applied, in order to generate reference data for prediction of a next block.

14. The pixel-based video codec of claim 13, wherein the pixel prediction unit transmits a signal indicating whether DPCM has been applied to the reference data generation unit.

15. The pixel-based video codec of claim 11, wherein the pixel prediction unit performs DPCM by predicting a luminance value of the current pixel from luminance values of neighbor pixels around a current pixel in the residual image block and the pixel reconstruction unit performs IDPCM by reconstructing the luminance value of the current pixel based on the luminance values of the neighbour pixels around the current pixel in the residual image block.

16. The pixel-based video codec of claim 15, wherein a luminance value $\hat{x}_{EDP}$ of the current pixel x is given by:

$$\hat{x}_{EDP} = \begin{cases} \min(a, b) & \text{if } c > \max(a, b) \\ \max(a, b) & \text{if } c < \min(a, b) \\ a + b - c & \text{otherwise} \end{cases}$$

where c indicates a luminance value of an edge pixel in the residual image block, and a and b indicate luminance values of neighbor pixels around the edge pixel with the luminance value of c, and the neighbor pixel with the smaller luminance value between a and b is used as a prediction pixel for the current pixel x if c is largest among a, b, and c, the neighbor pixel with the larger luminance value between a and b is used as the prediction pixel for the current pixel x if c is smallest, and it is determined that there is no edge and the luminance value of the current pixel x is predicted using a+b−c in other cases.

17. A pixel-based video codec stored in non-transitory media which includes a computer-readable media as well as a machine/computer comprising:
   a block identification unit identifying the encoding mode of a current block of an input video frame and whether the current block is an intra-mode block or an inter-mode block; and
   a prediction mode determination unit determining a prediction mode for the current block based on a rate distortion optimization (RDO) value calculated for the case where DPCM is applied to the current block and a RDO value calculated for the case where DPCM is not applied to the current block if the current block is an intra-mode block.

18. The pixel-based video codec of claim 17, further comprising:
   a residual image generation unit generating a prediction block corresponding to the current block in the determined prediction mode and generating a residual image block composed of a residual signal corresponding to a difference between pixels of the prediction block and pixels of the current block; and
   an entropy-coding unit performing entropy-coding on the residual image block.

19. The pixel-based video codec of claim 18, further comprising a reference data generation unit decoding the residual image block in order to generate reference data for prediction of a next block.

20. The pixel-based video codec of claim 19, further comprising:
   a transformation unit transforming the residual image block; and
   a quantization unit quantizing the transformed residual image block and transmitting the quantized residual image block to the entropy-coding unit.

21. The pixel-based video codec of claim 20, wherein the reference data generation unit comprises:
   an inverse quantization unit inversely quantizing the received bitstream; and
   an inverse transformation unit inversely transforming the inversely quantized bitstream and transmitting the inversely quantized bitstream to the pixel reconstruction unit.

22. A pixel-based video encoding method comprising:
   generating a prediction block corresponding to a current block to be encoded by performing temporal or spatial prediction between a reference image and a current image;
   generating a residual image block composed of a residual signal corresponding to a difference between pixels of the prediction block and pixels of the current block;
   performing pixel prediction by determining whether to apply differential pulse coded modulation (DPCM) to each of pixels of the residual image block based on a rate distortion optimization (RDO) value calculated for the case where DPCM is applied to each of the pixels of the residual image block and a RDO value calculated for the case where DPCM is not applied to each of the pixels of the residual image block; and
   performing entropy-coding on the residual image block.

23. The pixel-based video encoding method of claim 22, further comprising generate reference data for prediction of a next block by decoding the residual image block.

24. The pixel-based video encoding method of claim 23, wherein the performing pixel prediction comprises transmits a signal indicating whether DPCM has been applied to the generating reference data.

25. The pixel-based video encoding method of claim 23, further comprising transforming and quantizing the residual image block obtained by the pixel prediction.

26. The pixel-based video encoding method of claim 22, wherein DPCM is performed by predicting a luminance value of a current pixel from luminance values of neighbor pixels around the current pixel in the residual image block.

27. The pixel-based video encoding method of claim 26, wherein a luminance value $\hat{x}_{EDP}$ of the current pixel x is given by:

$$\hat{x}_{EDP} = \begin{cases} \min(a, b) & \text{if } c > \max(a, b) \\ \max(a, b) & \text{if } c < \min(a, b) \\ a + b - c & \text{otherwise} \end{cases}$$

where c indicates a luminance value of an edge pixel in the residual image block, and a and b indicate luminance values of neighbor pixels around the edge pixel with the luminance value of c, and the neighbor pixel with the smaller luminance value between a and b is used as a prediction pixel for the current pixel x if c is largest among a, b, and c, the neighbor pixel with the larger luminance value between a and b is used as the prediction pixel for the current pixel x if c is smallest, and it is determined that there is no edge and the luminance value of the current pixel x is predicted using a+b−c in other cases.

28. A non-transitory computer-readable medium having recorded thereon a program for implementing the pixel-based video encoding method claimed in any one of claims 22 through 27 and claims 32 through 42 and the pixel-based decoding method claimed in any one of claims 29 through 31.

29. A pixel-based video decoding method comprising:
receiving a bitstream including coefficients resulting from entropy-coding of a residual image block that selectively undergoes differential pulse coded modulation (DPCM) and a mode flag having information about whether DPCM has been applied to the residual image block;
performing pixel reconstruction by selectively performing inverse differential pulse coded modulation (IDPCM) on the coefficients based on the mode flag in order to reconstruct the residual image block; and
performing motion compensation based on the residual image block to which IDPCM is selectively applied.

30. The pixel-based video decoding method of claim 29, further comprising inversely quantizing and inversely transforming the received bitstream.

31. The pixel-based video decoding method of claim 29, wherein the performing pixel reconstruction comprises performing IDPCM by reconstructing a luminance value of a current pixel based on luminance values of neighbour pixels around the current pixel in the residual image block.

32. A pixel-based video encoding method comprising:
generating a prediction block corresponding to a current block to be encoded between a reference image and a current image and generating a residual image block composed of a residual signal corresponding to a difference between pixels of the prediction block and pixels of the current block;
performing pixel prediction by determining whether to apply differential pulse coded modulation (DPCM) to each of pixels of the residual image block based on a rate distortion optimization (RDO) value calculated for the case where DPCM is applied to each of the pixels of the residual image block and a RDO value calculated for the case where DPCM is not applied to each of the pixels of the residual image block;
performing pixel reconstruction by selectively performing inverse differential pulse coded modulation (IDPCM) on a bitstream generated by entropy-coding the residual image in order to reconstruct the residual image block; and
performing motion compensation based on the residual image block to which IDPCM is selectively applied.

33. The pixel-based video encoding method of claim 32, wherein the performing pixel prediction transmits information about whether DPCM has been applied to the performing pixel reconstruction through the bitstream.

34. The pixel-based video encoding method of claim 33, further comprising generating reference data for prediction of a next block by decoding the residual image block to which DPCM has been selectively applied.

35. The pixel-based video encoding method of claim 34, the performing pixel prediction further comprising, transmitting a signal indicating whether DPCM has been applied to the generating reference data.

36. The pixel-based video encoding method of claim 32, wherein the performing pixel prediction comprises performing DPCM by predicting a luminance value of a current pixel from luminance values of neighbor pixels around the current pixel in the residual image block.

37. The pixel-based video encoding method of claim 36, wherein a luminance value $\hat{x}_{EDP}$ of the current pixel x is given by:

$$\hat{x}_{EDP} = \begin{cases} \min(a, b) & \text{if } c > \max(a, b) \\ \max(a, b) & \text{if } c < \min(a, b) \\ a + b - c & \text{otherwise} \end{cases}$$

where c indicates a luminance value of an edge pixel in the residual image block, and a and b indicate luminance values of neighbor pixels around the edge pixel with the luminance value of c, and
the neighbor pixel with the smaller luminance value between a and b is used as a prediction pixel for the current pixel x if c is largest among a, b, and c, the neighbor pixel with the larger luminance value between a and b is used as the prediction pixel for the current pixel x if c is smallest, and it is determined that there is no edge and the luminance value of the current pixel x is predicted using a+b−c in other cases.

38. A pixel-based video encoding method comprising:
identifying the encoding mode of a current block of an input video frame and whether the current block is an intra-mode block or an inter-mode block; and
determining a prediction mode for the current block based on a rate distortion optimization (RDO) value calculated for the case where DPCM is applied to the current block and a RDO value calculated for the case where DPCM is not applied to the current block if the current block is the intra-mode block.

39. The pixel-based video encoding method of claim 38, further comprising:
generating a prediction block corresponding to the current block in the determined prediction mode and generating a residual image block composed of a residual signal corresponding to a difference between pixels of the prediction block and pixels of the current block; and
performing entropy-coding on the residual image block.

40. The pixel-based video encoding method of claim 39, further comprising generating reference data for prediction of a next block by decoding the residual image block.

41. The pixel-based video encoding method of claim 40, further comprising transforming and quantizing the residual image block.

42. The pixel-based video encoding method of claim 41, wherein the generating reference data comprises inversely quantizing and inversely transforming the received bitstream.

* * * * *